(12) United States Patent
Beall et al.

(10) Patent No.: US 6,686,305 B1
(45) Date of Patent: Feb. 3, 2004

(54) METHODS OF MAKING LOW THERMAL EXPANSION CALCIUM ALUMINATE ARTICLES

(75) Inventors: Douglas M. Beall, Painted Post, NY (US); Shahid G. Lakhwani, Painted Post, NY (US); Linda R. Pinckney, Corning, NY (US)

(73) Assignee: Corning Incorporated, Corning, NY (US)

( * ) Notice: Subject to any disclaimer, the term of this patent is extended or adjusted under 35 U.S.C. 154(b) by 67 days.

(21) Appl. No.: 10/255,725

(22) Filed: Sep. 25, 2002

(51) Int. Cl.[7] .......................................... C04B 35/057
(52) U.S. Cl. ...................................... 501/124; 501/125
(58) Field of Search ................................. 501/124, 125; 264/630

(56) References Cited

U.S. PATENT DOCUMENTS

| | | | | |
|---|---|---|---|---|
| 3,312,558 A | * | 4/1967 | Miller | 501/125 |
| 3,969,542 A | * | 7/1976 | Tomita et al. | 502/250 |
| 4,204,878 A | * | 5/1980 | Nudelman et al. | 106/104 |
| 4,960,737 A | | 10/1990 | Guile et al. | 501/125 |
| 5,374,392 A | * | 12/1994 | Skelcey et al. | 419/49 |

FOREIGN PATENT DOCUMENTS

JP   2-160661   *   6/1990

OTHER PUBLICATIONS

E. R. Boyko et al. *The Optical Properties and Structures of CaO, $2Al_2O_3$ and $SrO.2Al_2O_3$*, Acta Cryst. 11, 444–445 (1958). * No Month.

D. W. Goodwin et al, *The Crystal Structure of $CaO.2Al_2O_3$*, Acta Cryst. B26, 1230–1232 (1970). * No Month.

V. I. Ponomarev et al., *Crystal Structure of Calcium Dialuminate, $CA_2$*, Soviet Physics–Crystallography 15, 995–998 (1971). * No Month.

D. Weber et al., *The Occurrence of Grossite ($CaAl_4O-$) in Chondrites*, Geomchim. Cosmichim. Acta 58, 3855–3877 (1994). * No Month.

E. Criado et al., *Calcium Hexaluminates as Refractory Material*, UNITECR Congress, Aachen, 403–407 (1991). * No Month.

S. Jonas et al.., *A New Non–silicate Refractory of Low Thermal Expansion*, Ceramics International 24, 211–216 (1998). * No Month.

S. Jonas et al., *Low Thermal Expansion Refractory Composites Based on $CaAl_4O-$*, Ceramics International 25, 77–84 (1999). * No Month.

Y. Suzuki et al., *In Situ Synthesis and Microstructure of Porous $CaAl_4O-/CaZrO_3$ Composite*, J. Ceram. Soc. Japan 109, 205–209 (2001). * No Month.

R. D. Shannon et al., *Effective Ionic Radii in Oxides and Fluorides**, Acta Cryst. 925–946 (1969). *No Month.

* cited by examiner

Primary Examiner—Karl Group
(74) Attorney, Agent, or Firm—Scott Servilla; Anca C. Gheorghiu

(57) ABSTRACT

Methods of making ceramic bodies are disclosed. The methods include manufacturing calcium aluminate material having a low coefficient of thermal expansion.

18 Claims, 3 Drawing Sheets

METHODS OF MAKING LOW THERMAL EXPANSION CALCIUM ALUMINATE ARTICLES

FIELD OF THE INVENTION

This invention relates to methods of manufacturing ceramic articles. More particularly, the invention relates to the manufacture of low thermal expansion calcium aluminate compositions.

BACKGROUND OF THE INVENTION

Low thermal expansion ceramic bodies are desirable in a wide variety of applications. For example, low expansion bodies have been used as filters for fluids, in particular, as diesel particulate filters and as substrates for catalytic converters, an example of which is known in the art as a honeycomb substrate. Additionally, low thermal expansion bodies are desirable in applications where the thermal shock resistance and the ultimate use temperature are high. Substrates used under conditions of high thermal gradients are examples of this application. Typically, structures such as honeycomb and cellular substrates are subjected to harsh environments which require high thermal shock resistance, low thermal expansion, and high mechanical shock properties. Maintaining these properties for extended periods of time in their intended environments eliminates many potentially useful refractory materials.

Cordierite substrates, typically in the form of a honeycomb body, have long been preferred for use as substrates to support catalytically active components for catalytic converters on automobiles, in part due to high thermal shock resistance of cordierite ceramics. The thermal shock resistance is inversely proportional to the coefficient of thermal expansion. That is, honeycombs with a low thermal expansion have a good thermal shock resistance and can survive the wide temperature fluctuations that are encountered in the application. Manufacturers work continuously to optimize the characteristics of cordierite substrates to enhance their utility as catalyst carriers. Specifically, manufacturers continually strive to optimize the thermal shock resistance and other properties of the cordierite substrates.

There is a need to provide alternative low CTE materials that can be used in high temperature applications and methods of making such materials.

SUMMARY OF THE INVENTION

One embodiment of the invention relates to a method of making a ceramic article comprising mixing powdered raw materials including the phases calcium monoaluminate and calcium dialuminate, forming the powders into a green ceramic body, and firing the ceramic body to a temperature such that the thermal expansion of the fired body is less than $30 \times 10^{-7}/°$ C. over the temperature range 25° C. to 800° C. In some embodiments, the firing temperature is less than about 1550° C., and in certain embodiments, the firing temperature is less than about 1500° C.

In certain embodiments of the method, the powdered raw materials include calcium aluminate cement. In some embodiments, the method includes adding alumina powder to the powdered raw materials. In other embodiments it may be desirable to mix the calcium aluminate cement with calcium oxide source powders such as calcium carbonate, calcium oxalate, and calcium dihydroxide powders. In other embodiments, the raw materials are provided by forming a ceramic body and firing the body to form the phases calcium monoaluminate and calcium dialuminate and grinding the body to provide powders containing calcium monoaluminate and calcium dialuminate. It may be desirable in certain embodiments to add a hydration inhibitor such as sugar or citric acid.

According to certain embodiments of the invention, dimensional control of the body is maintained during firing of the body to form the ceramic article. In some embodiments, the change in percentage change in length of the article during firing over the temperature range of about 1000° C. and 1400° C. is less than about 5%, preferably less than 3%, and more preferably, less than 2%.

In some embodiments of the present invention, the coefficient of thermal expansion of the article formed by the method is less than about $20 \times 10^{-7}/°$ C. over the temperature range 25° C. to 800° C. In other embodiments, the coefficient of thermal expansion of the article formed by the method is less than about $10 \times 10^{-7}/°$ C. over the temperature range 25° C. to 800° C.

certain embodiments of the invention relate to a method of manufacturing a fired calcium aluminate body comprising mixing powdered materials including phases of calcium monoaluminate and calcium dialuminate in a ratio sufficient to avoid hydration of the fired body, forming a green body from the powdered materials, and firing the body to a temperature such that the coefficient of thermal expansion is less than about $30 \times 10^{-7}/°$ C. over the temperature range 25° C. to 800° C. In certain embodiments, the amount of calcium monoaluminate present is less than about 10% by weight. In other embodiments, the amount of calcium monoaluminate present is less than about 5% by weight. In still other embodiments, the amount of calcium monoaluminate present is less than about 1% by weight.

It is to be understood that both the foregoing general description and the following detailed description are exemplary and are intended to provide further explanation of the invention as claimed.

DETAILED DESCRIPTION

Figure 1:
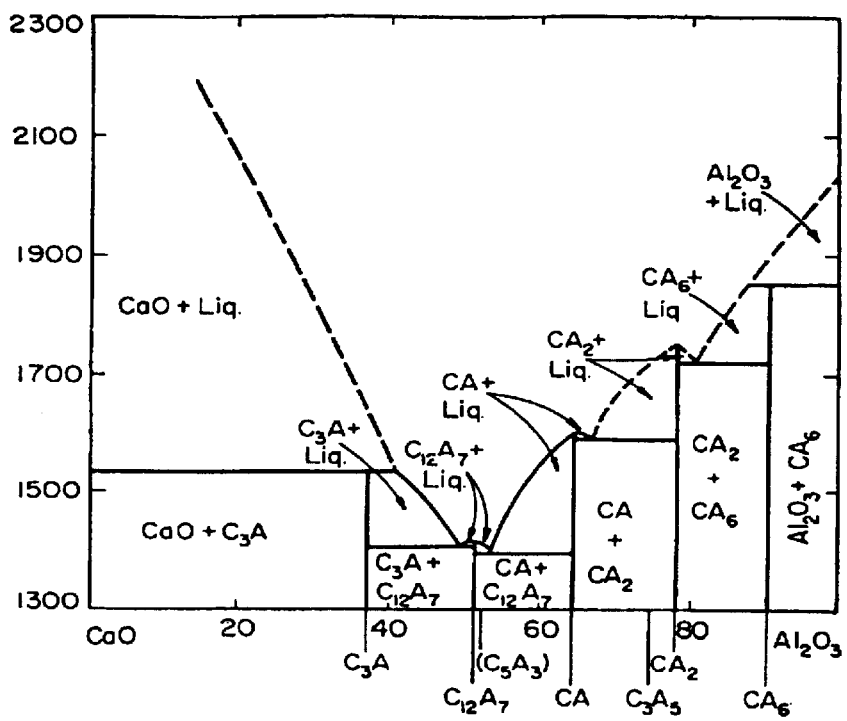
FIG. 1 is a phase diagram of $CaO$—$Al_2O_3$.

Before describing several exemplary embodiments of the invention, it is to be understood that the invention is not limited to the details of construction or process steps set forth in the following description. The invention is capable of other embodiments and of being practiced or carried out in various ways.

The various embodiments of the present invention provide methods and articles having low coefficients of thermal expansion. It has been discovered that to achieve this low thermal expansion, varying the combination of raw materials and the firing schedule can be utilized to achieve the desired properties. By controlling the final stoichiometry of the fired article proper combinations of raw material types and the firing schedules utilized in the production of the ceramic articles, the thermal expansion of articles can be lowered.

The general method of producing the articles of the present invention includes mixing the appropriate batch raw materials, preferably raw materials having an average particle diameter of less than about 150 microns. In certain embodiments, the average particle diameter of the starting powders is less than about 50 microns, and in alternative embodiments, the average particle diameter is less than about 15 microns. The mixed powders are then blended and then formed by extrusion or other appropriate forming methods into a green article, for example, a honeycomb body. The article is then subsequently sintered to a hard porous structure. Various lubricants and organic binders such as methylcellulose are added to the batch during the mixing step to provide viscosity control and strength prior to firing and to provide porosity to the structure after firing. Porosity is also governed by the raw materials and the firing temperature. Higher firing temperatures result in lower porosity structures. In certain embodiments, the firing temperature is greater than about 1450° C., and in other embodiments, greater than about 1500° C. In other embodiments, the articles are fired to temperatures greater than about 1550° C., but less than about 1600° C. As will become evident in the examples below, the actual firing temperature will depend on the stoichiometry of the ceramic body.

Another embodiment of the present invention relates to methods of manufacturing calcium aluminate materials that have low thermal expansions which can be used in the manufacture of catalyst system supports. In several applications in which article encounter severe thermal shock conditions and thermal stresses, lower CTE bodies are required.

Lower CTE is desirable to make monolithic articles more resistant to failure under certain thermal shock conditions. Variation of the ratio of calcium oxide to aluminum oxide ratio and the firing temperature of the articles provides a calcium aluminate compound having low CTE values. The new compounds were formed by mixing powdered raw materials containing the phases calcium monoaluminate ($CaAl_2O_4$) and calcium dialuminate (grossite or $CaAl_4O_7$), forming the powders into articles and firing to temperatures exceeding about 1450° C., and in certain embodiments, to temperatures as high as about 1550° C. However, the actual firing temperature will depend on the composition of the body.

The present invention provides methods for manufacturing calcium aluminate articles having low CTEs that do not require long (e.g., exceeding 24 hours) firing schedules at temperatures exceeding 1600° C. While the present invention should not be limited by any theory of operation, it is believed that firing of calcium aluminate articles at temperatures exceeding 1600° C. for extended periods of time can cause the article to distort, possibly due to the formation of a liquid phase. This liquid phase can cause the ceramic article to stick to the setter on which it is fired. Articles made from starting powdered raw materials including the phases calcium monoaluminate and calcium dialuminate avoids rapid hydration of the fired article when exposed to water. Hydration of the article can result in dissolution of the ceramic, and subsequent re-precipitation of high thermal expansion calcium aluminate hydrates which result in large increases in thermal expansion coefficient, as well as weight loss of the ceramic article. Avoidance of these types of problems will allow calcium aluminate articles to be used in applications such as honeycomb ceramic catalyst carrier substrates.

Applicants have further discovered that the use of powdered raw materials including the phases calcium monoaluminate and calcium dialuminate results in better dimensional control of articles can be maintained during firing. The raw materials used in the present invention can include combining CaO and $Al_2O_3$ source powders in a ratio that will form the phases calcium monoaluminate and calcium dialuminate upon firing and then grinding the fired material into a powder. Suitable combinations of such raw materials are disclosed in copending patent application serial number XX entitled, "Fabrication of Low Thermal Expansion Calcium Aluminate Articles," naming Douglas Beall and Shahid Lakhwani as inventors, the content of which is incorporated herein by reference. Binder and water are added to the powdered raw materials including calcium monoaluminate and calcium dialuminate. In certain embodiments, it may be desirable to mix the calcium monoaluminate and calcium dialuminate powders with aluminum oxide and/or calcium oxide source powders to adjust the stoichiometry of the article. The powdered raw materials are formed using an appropriate method such as extrusion, and then the formed material is dried and fired to a temperature to yield an article having a thermal expansion less than $30 \times 10^{-7}/°$ C. over the temperature range 25° C. to 800° C. Alternatively, the powdered raw material can include commercially available calcium aluminate cement. By using the powdered raw materials described herein, articles can be produced that have reduced thermal expansion and require lower firing temperatures. In addition, use of these raw materials increased the level of porosity in the body after firing. Additional porosity can be an advantage in several applications. For example, in catalyst carrier applications, additional porosity aids in the washcoating process and subsequently in allowing the washcoat to adhere to the substrate surface.

Suitable calcium aluminate powdered raw materials include, but are not limited to calcium aluminate cements. For example, one suitable raw material includes CA-14S calcium aluminate cement, available from Alcoa, which is roughly 70% $Al_2O_3$ and 30% CaO. For certain desired compositions, it may be desirable to mix powdered alumina and/or calcium oxide source powders such as calcium carbonate with the calcium aluminate cement to achieve the desired stoichiometry and dimensional control.

Figure 3:
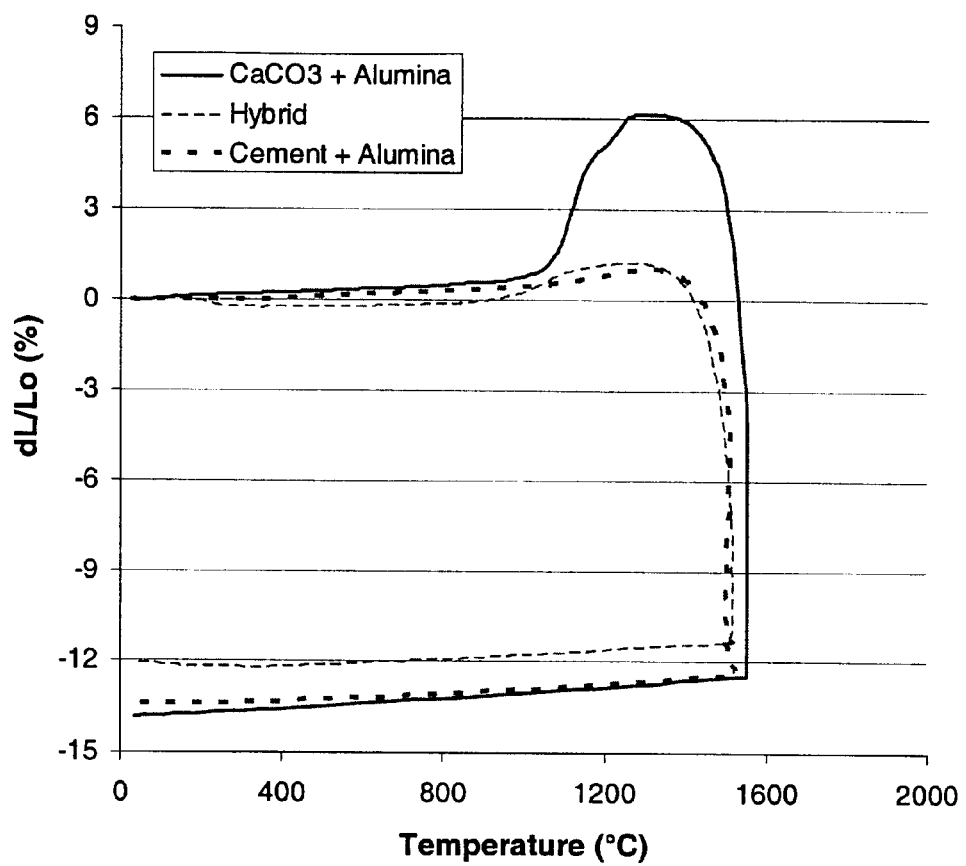
FIG. 3 is a graph of the ratio of change in length versus original length versus temperature for calcium aluminate green articles made from different compositions and heated to 1600° C.

An organic binder system, water and a hydration inhibitor were added to the raw materials. The hydration inhibitor which can include materials including, but not limited to sugar and citric acid, and prevents the material from forming cement during processing. The mixtures were extruded, dried and fired to temperatures between 1400° C. and 1600° C. The use of a calcium monoaluminate and calcium dialuminate raw materials aids in maintaining dimensional control of the ceramic article during firing. As shown in FIG. 3, ceramic articles made with alumina and calcium carbonate alone go through a substantial growth exceeding 5% between about 1000° C. and 1400° C. followed by a substantial shrinkage during firing. While the present invention should not be limited by a particular theory, it is believed that the growth appears to be due an overall density reduction as the raw materials are converted from alumina and calcium carbonate to calcium monoaluminate (CA) and calcium dialuminate ($CA_2$) at temperatures between about 1000–1400° C. The density reduction results in a volume increase during firing. Following this expansion, the ceramic article goes through a major shrinkage near the top holding temperature in the firing cycle. The shrinkage is thought to be associated with a liquid-phase sintering process, and, as shown in FIG. 3, the net shrinkage of the part after firing is about 18–20%. This expansion and contraction during firing makes it very difficult to maintain dimensional control. It has been found that parts made with the pre-reacted calcium monoaluminate and calcium dialuminate materials plus alumina and/or calcium carbonate (if necessary) do not go through significant volume expansion, and the net shrinkage of the articles after firing to 1550° C. for 24 hours is about less than about 15%. The article made from calcium aluminate cement plus alumina exhibited an expansion between 1000° C. and 1400° C. of less than 5%. In addition, articles made with a combination of calcium carbonate, aluminum oxide and calcium aluminate cement also exhibited an expansion between 1000° C. and 1400° C. of less than 5%. This makes it much easier to control dimensions of the ceramic article during the firing operation. In addition, it is desirable to avoid higher overall dimensional changes during firing to avoid distortion of the body during firing and to maintain dimensional tolerances of the finished article.

According to one specific embodiment of the invention, substrates for catalysts systems for the purification of exhaust gases are provided, particularly for improved NO$_x$ adsorption efficiency. In certain embodiments, the substrates are resistant to alkali migration below 1000° C. and have a coefficient of thermal expansion less than about $30 \times 10^{-7}$/° C. over the temperature range of about 25° C. to 800° C. In some embodiments, the coefficient of thermal expansion is less than about $20 \times 10^{-7}$/° C. over the temperature range of about 25° C. to 800° C., and in certain embodiments, the CTE of the articles are less than about $15 \times 10^{-7}$/° C. over the temperature range of about 25° C. to 800° C. In other embodiments, the CTE is less than about $10 \times 10^{-7}$/° C. over the temperature range of about 25° C. to 800° C.

Without intending to limit the invention in any manner, the present invention will be more fully described by the following examples.

EXAMPLES

Figure 2:
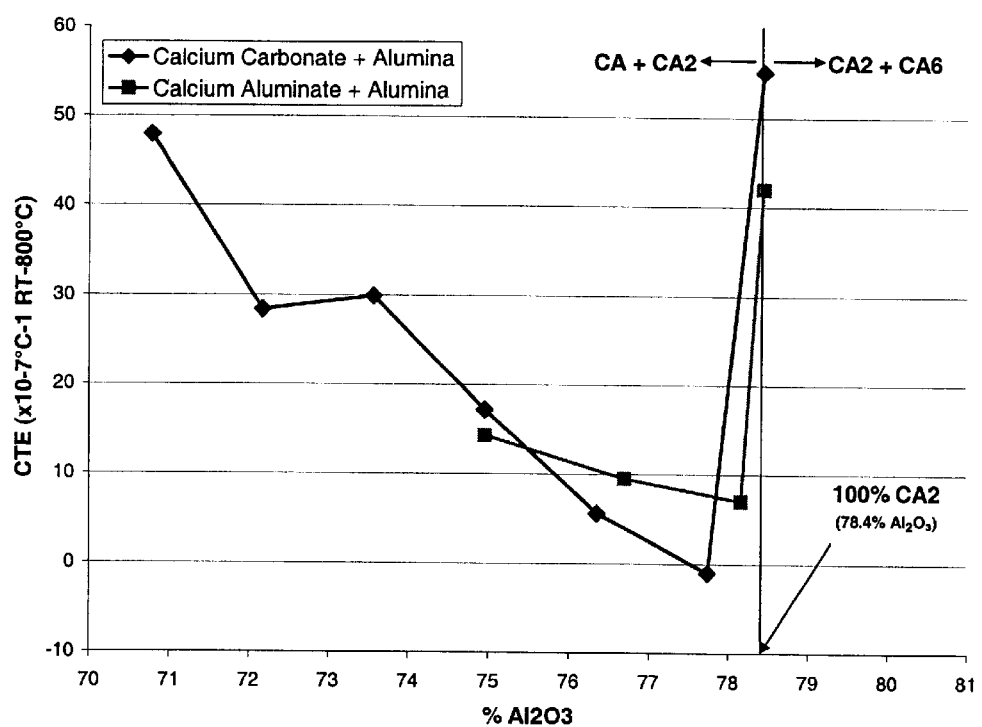
FIG. 2 is a graph showing the coefficient of thermal expansion for calcium aluminate articles made from different compositions.

Inorganic powder batch mixes suitable for the formation of calcium aluminate ceramic bodies are shown in FIG. 2 and indicated by weight percent alumina. The inorganic compositions were formed by drymixing calcium carbonate and alumina or calcium aluminate cement and alumina or calcium carbonate, calcium aluminate cement and alumina source powders having an average particle size between about 0.5 and 20 microns together with a cellulose ether binder, being either a methyl-cellulose or another cellulose ether derivative, in the range of 2–6% by weight of the inorganic components. Water is then added to the resulting batch in the range of 15–25% by weight of the inorganic components and the resulting batch is further mixed to form a plasticized ceramic batch mixture. All of the prepared batches were then extruded through a honeycomb die using a ram extruder to form a ceramic honeycomb structure. The formed honeycomb bodies were dried overnight and fired to temperatures ranging from about 1550° C. to sinter the parts and form calcium aluminate honeycomb structures in the desired stoichiometry. The compositions discussed below with respect to FIG. 2 are based on weight percent CaO and Al$_2$O$_3$, but using calcium carbonate as the source material for CaO.

The results in FIG. 2 indicate that calcium aluminate bodies having surprisingly low CTEs less than about $30 \times 10^{-7}$/° C. can be obtained with bodies containing between about 27.8 and 21.6 weight percent CaO. Bodies containing higher amounts of alumina required firing to higher temperatures to achieved low CTEs. Compositions having starting CaO contents of between about 20% and 30% by weight and between about 70% and 80% aluminum oxide content by weight and fired in excess of 1500° C. will exhibit low CTEs, that is, CTEs less than about $25 \times 10^{-7}$/° C. over the temperature range of about 25° C. to 800° C. FIG. 2 also shows that bodies made from calcium aluminate and alumina raw materials exhibited CTE's that are comparable to CTE's exhibited by bodies made from calcium carbonate and alumina alone. These low CTE materials are of use in applications where thermal shock conditions may be encountered because lower CTE values result in improved thermal shock resistance for the material. These materials will be particularly suitable in the manufacture of catalyst substrates used in automotive applications.

The data in FIG. 3 were generated by firing 3 different extruded green samples to 1550° C. and monitoring their length change during firing. The first sample was made from a 33.3 weight percent calcium carbonate and 66.7 weight percent alumina raw materials plus methocellulose binder and water. A second sample was an extruded sample made from 84 weight percent calcium aluminate cement and 16 weight percent alumina plus binder and water and 1% sugar as a hydration inhibitor. The third sample was a hybrid sample made from 64.2 weight percent calcium aluminate cement, 9.5 weight percent calcium carbonate and 26.3 percent aluminate plus methocellulose and water. As shown in FIG. 3, the sample made from calcium aluminate cement and alumina and the hybrid sample made from calcium aluminate cement, calcium carbonate and alumina exhibited very low expansions between 1000° C. and 1400° C. However, the sample made from calcium carbonate and alumina exhibited a length change exceeding 5% between 1000° C. and 1400° C.

While the present invention should not be limited by any particular theory, it is believed that a network of microcracks is formed on cooling after firing the novel calcium aluminate bodies described herein. The bodies having low CTEs are comprised of a major phase of CaAl$_4$O$_7$ (Grossite or calcium dialuminate or CA$_2$) and minor phases of CaAl$_2$O$_4$ (calcium monoaluminate or CA). The microcracks are thought to form as a result of thermal expansion anisotropy in the CaAl$_4$O$_7$ unit cell. This thermal expansion anisotropy creates areas of local mismatch stresses between grains of differing orientations, which if high enough, is able to create microfractures within the ceramic microstructure. The higher firing temperature presumably allows the grains to grow greater than the average size required for microcrack formation. It is believed that the network of microcracks is effective in decreasing the macroscopic thermal expansion coefficient, because on heating, the microcracks are healed. This healing of the microcracks is accomplished by accommodating positive thermal expansion of surrounding grains. Since the positive thermal expansion is used to heal the microcrack, the effect is to lower the overall thermal expansion of the polycrystalline sample. This reduction in observed thermal expansion coefficient continues until the cracks are sufficiently healed, whereupon the observed CTE returns to the average of the linear expansion in the three axes of the unit cell. On cooling, the process is reversed, and the cracks re-open again due to the fracture energy generated by locally misaligned neighboring grains.

Viewing the CaO—Al$_2$O$_3$ phase diagram (shown in FIG. 1), it can be seen that compositions falling within the CA+CA$_2$ phase field (containing about 64.5–78.4% Al$_2$O$_3$) result in the formation of some liquid when fired to temperatures approaching 1600° C. (or somewhat lower depending on levels of impurities). In the inventive compositions which fall within this range of alumina content, it is likely that liquid formation at high temperatures in firing results in some liquid-phase sintering. This liquid probably also supports the tremendous grain growth which is necessary to form the network of microcracks.

When compositions in the CA+CA$_2$ phase field are fired to high enough temperatures, a liquid phase is formed, and the stable phases are CA$_2$+liquid. The amount of liquid formed at a given temperature increases as the level of alumina in the base composition decreases as defined by the lever rule. Therefore, compositions falling in this phase field increase in alumina content up to almost 78.4%, the amount of liquid present above the solidus temperature decreases. It is believed that the smallest amount of liquid required to obtain sufficient grain growth would be preferred from a processing standpoint. This is because large volumes of liquid phase can result in significant distortion of the part and sticking to the setter on which the ceramic article is fired.

Therefore, to achieve a low coefficient of thermal expansion in compositions rich in CA$_2$, a body should contain a network of fine microcracks, which act to moderate bulk expansion as the cracks are healed during heating. Conversely, upon cooling, the cracks reversibly open again, resulting in a reduced thermal expansion as the opening of cracks serves to reduce the thermal expansion coefficient compared to a body where no cracks open upon cooling. It has also been observed in SEM micrographs of samples that a certain grain size of the CA$_2$ phase is required to generate enough fracture energy to create the microfractures in neighboring misaligned grains. This grain size is believed to be between about 10 and 100 $\mu$m.

Applicants have also discovered that the thermal expansion properties can be optimized through control of the ratio of CaO to Al$_2$O$_3$ in the ceramic article. Referring to FIG. 2, compositions containing about 75% Al$_2$O$_3$ and 25% CaO in the composition (resulting in 75% calcium dialuminate or CA2 and 25% calcium monoaluminate or CA after firing) could give relatively low CTE, while an increase in Al$_2$O$_3$ content to a composition containing 21.6% CaO and 78.4% Al$_2$O$_3$ (corresponding to 100% CA$_2$) would result in a very high CTE (>40×10$^{-7}$° C.$^{-1}$ RT-800° C.) when fired under the same conditions. Subsequent work has shown that the thermal expansion coefficient decreases with increasing alumina content until the stoichiometric CA$_2$ composition is reached at moderate firing temperatures.

In addition to showing the influence of alumina content on CTE for compositions made with calcium carbonate and alpha alumina as the starting raw materials, FIG. 2 shows comparable CTEs of articles made using calcium aluminate cement and alpha alumina raw materials. Referring to FIG. 1 and FIG. 2, the results indicate a general trend of decreasing CTE as a function of increasing alumina content within the CA+CA$_2$ phase field for both compositions. When the alumina content reaches 78.4%, which corresponds to 100% CA$_2$, the expansion coefficient increases sharply. FIG. 2 shows that further increases in alumina content beyond this point also result in elevated levels of CTE. The graph of the compositions made with calcium carbonate+alumina shows increasing CTE from 75% to 78.4% alumina, which is most likely due to insufficient grain growth to induce microcracking for the temperatures at which the samples were fired.

Compositions in the CaO—Al$_2$O$_3$ system are subject to reactions with water. The reactions begin with dissolution of Ca$^{2+}$, and Al(OH)$^{4-}$ until a supersaturated condition is reached, whereupon precipitation of calcium aluminate hydrates and aluminum hydrate phases is encountered. The hydrated phases precipitate in needle-like crystals, which are interlocked to provide a strong matrix. Some materials in this system are therefore suitable as cement. The precipitation of the hydrated phases serves to increase thermal expansion coefficient, so therefore it is to be avoided for applications requiring low thermal expansions. The extent of reactions described above is dependent upon a number of factors, but one factor is the alumina content and phase assemblage of the calcium aluminate constituents. Commercially available calcium aluminate cements contain the phases C$_{12}$A$_7$, CA, and CA$_2$. The most reactive phase is C$_{12}$A$_7$, while CA is reactive, and CA$_2$ is the least reactive phase. CA$_2$ is considered not reactive enough to be used as a raw material by itself, and therefore, it must be combined with substantial amounts of C$_{12}$A$_7$ or CA to produce a viable cement material. On the other hand, CA is fairly reactive, and some commercially available cements are based on this phase. Therefore, in order to have good resistance to hydration reactions, a ceramic article should have a minimum level of CA phase present. An experiment was performed to compare the hydration rates for samples with 75% alumina (25% CA) and 78.1% alumina (2% CA). Both were made from the same starting raw materials (calcium aluminate cement and alumina) and fired under the same conditions (1550° C./24 hours). Both were then submerged in deionized water at room temperature for 48 hours. The ratio of water to ceramic material was 500 to 1 by weight. The change in weight was monitored. The 75% alumina sample lost 7.4% of its weight while the 78.1% alumina sample lost only 1.2% under the same conditions. Therefore, a presently preferred composition is one in which a small amount or no CA is present for reduced reactivity with water.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A method of manufacturing a ceramic article comprising:

mixing powdered material including the phases calcium monoaluminate and calcium dialuminate;

forming the powders into a green ceramic body; and firing the ceramic body to a temperature such that the thermal expansion of the fired body is less than 30× 10$^{-7}$/° C. over the temperature range 25° C. to 800° C.

2. The method of claim 1, wherein the firing temperature is less than about 1550° C.

3. The method of claim 1, wherein the firing temperature is less than about 1500° C.

4. The method of claim 1, wherein the powdered material includes calcium aluminate cement.

5. The method of claim 4, further comprising adding alumina powder to the powdered material.

6. The method of claim 5, further comprising adding a calcium oxide source powder to the powdered material.

7. The method of claim 6, wherein the calcium oxide source powder includes calcium carbonate.

8. The method of claim 1, further comprising maintaining dimensional control of the body during firing.

9. The method of claim 8, wherein the percentage change in length of the body during firing between the temperatures of about 1000° C. and 1400° C. is less than about 5%.

10. The method of claim 9, wherein the percentage change in length of the body over the temperature range of about is less than about 5%.

11. The method of claim 1, wherein the fired body includes the phases calcium monoaluminate and calcium dialuminate.

12. The method of claim 1, wherein the coefficient of thermal expansion of the fired body is less than about 20×10$^{-7}$/° C. over the temperature range 25° C. to 800° C.

13. The method of claim 1, wherein the coefficient of thermal expansion of the fired body is less than about $10 \times 10^{-7}/°$ C. over the temperature range 25° C. to 800° C.

14. The method of claim 1, further comprising forming a ceramic body and firing the body to form the phases calcium monoaluminate and calcium dialuminate and grinding the body to provided powders containing calcium monoaluminate and calcium dialuminate.

15. A method of manufacturing a fired calcium aluminate body comprising:

mixing powdered materials including phases of calcium monoaluminate, calcium dialuminate and alumina in a ratio sufficient to avoid hydration of the fired body;

forming a green body from the powdered materials; and firing the body to a temperature such that the coefficient of thermal expansion is less than about $30 \times 10^{-7}/°$ C. over the temperature range 25° C. to 800° C.

16. The method of claim 15, wherein the amount of calcium monoaluminate present is less than about 10% by weight.

17. The method of claim 15, wherein the amount of calcium monoaluminate present is less than about 5% by weight.

18. The method of claim 15, wherein the amount of calcium monoaluminate present is less than about 1% by weight.

* * * * *